Patented Aug. 28, 1923.

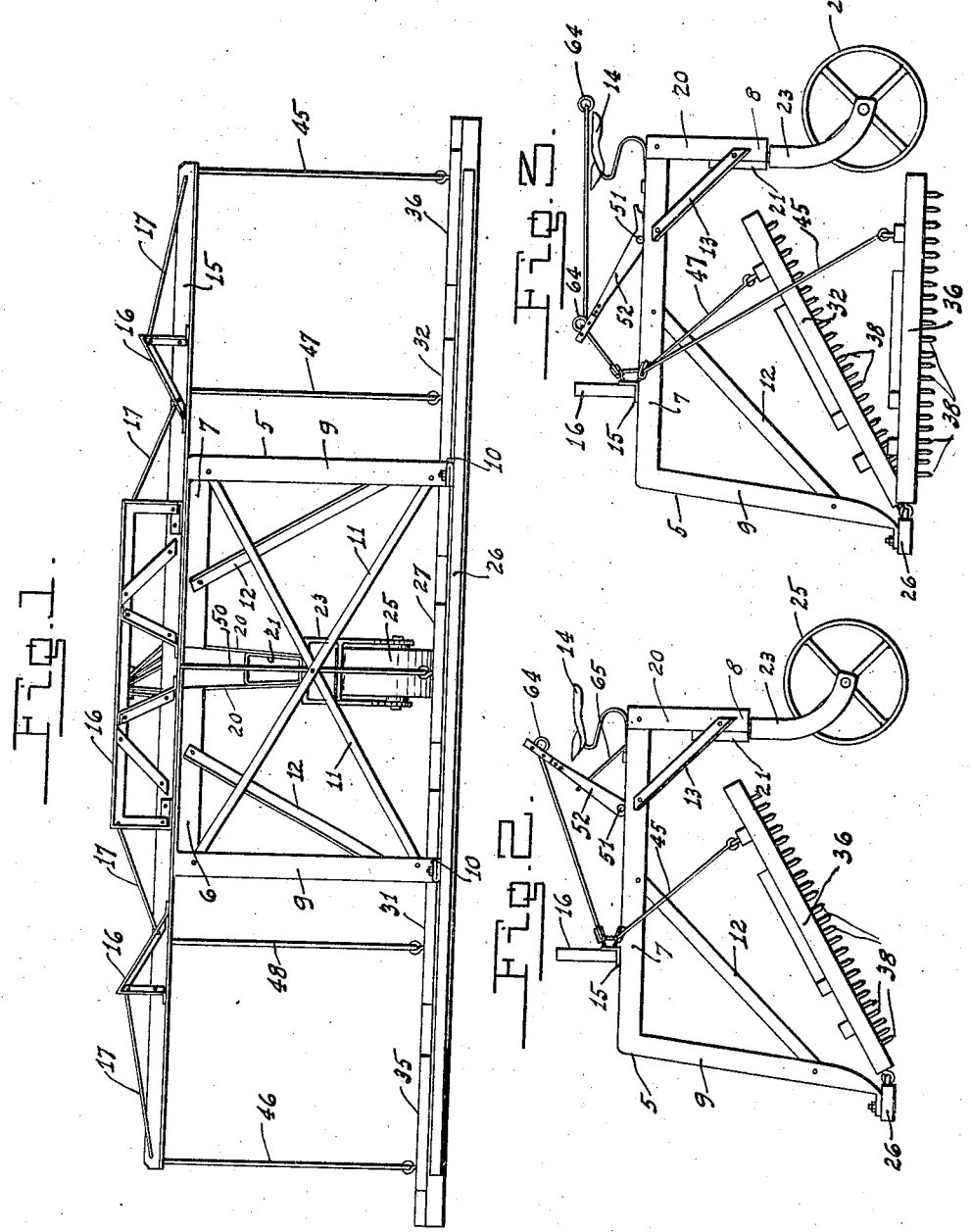
Aug. 28, 1923.
C. G. A. JOHNERSON
ADJUSTABLE HARROW
Filed Jan. 14, 1922
1,466,172
2 Sheets-Sheet 1
Inventor
C.G.A. Johnerson
By Watson E. Coleman, Attorney Aug. 28, 1923.
C. G. A. JOHNERSON
1,466,172
ADJUSTABLE HARROW
Filed Jan. 14, 1922
2 Sheets-Sheet 2
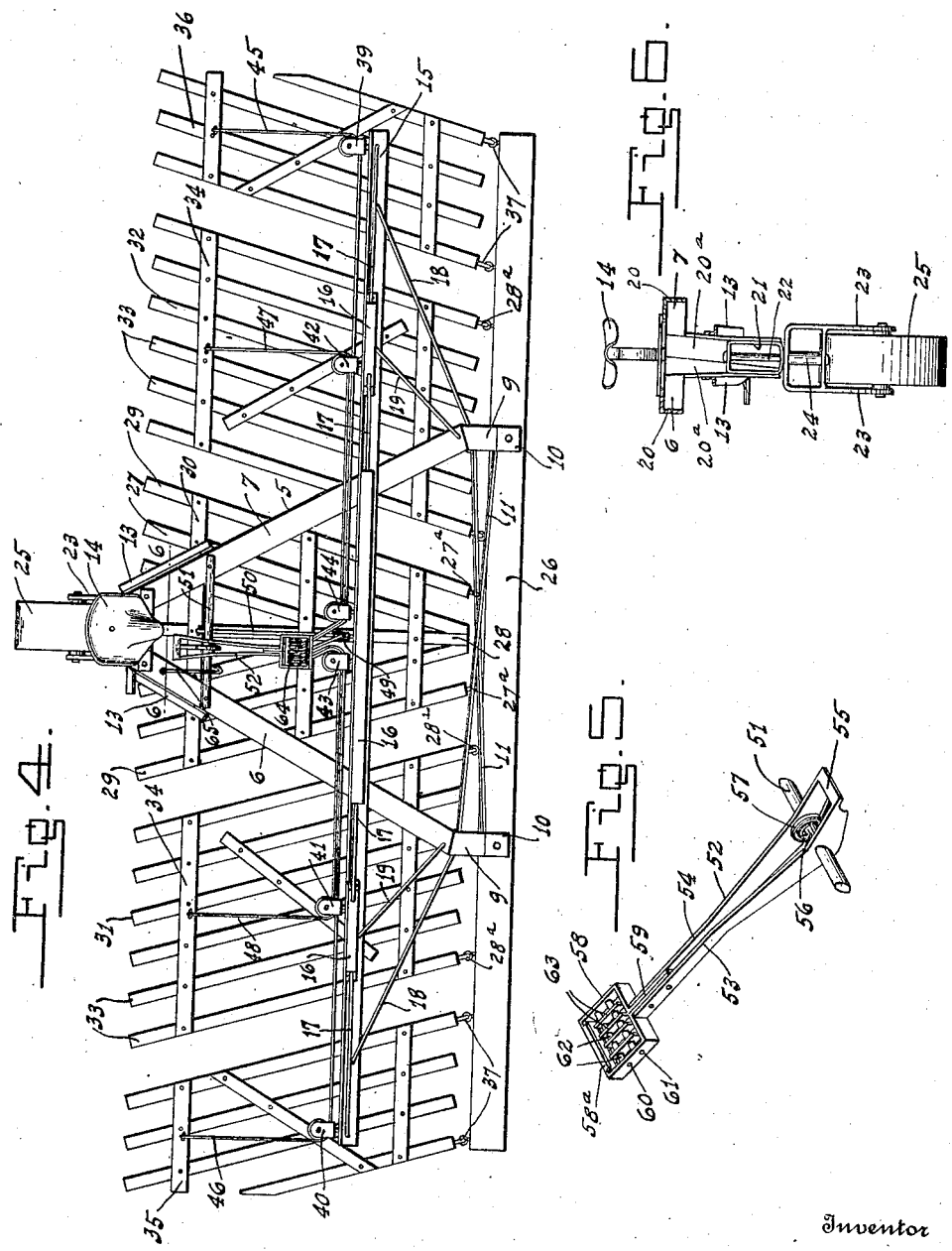

1,466,172

UNITED STATES PATENT OFFICE.

CARL G. A. JOHNERSON, OF FARGO, NORTH DAKOTA.

ADJUSTABLE HARROW.

Application filed January 14, 1922. Serial No. 529,321.

*To all whom it may concern:*

Be it known that I, CARL G. A. JOHNERSON, a citizen of the United States, residing at Fargo, in the county of Cass and State of North Dakota, have invented certain new and useful Improvements in Adjustable Harrows, of which the following is a specification, reference being had to the accompanying drawings.

This invention relates to harrows and more particularly to an adjustable harrow.

It is an object of the invention to provide a device of this character provided with means for cleaning harrow implements without requiring the driver to leave the seat of the harrow.

It is another object of the invention to provide a harrow of this character including a plurality of harrow elements, each of which is provided with means for lifting or lowering the same relative to the harrow frame or support, said means being operable or adjustable individually for raising the respective harrow elements, or simultaneously for raising or lowering all of the harrow elements.

It is also an object of the invention to provide a harrow of this character wherein the driver's seat is disposed a considerable distance from the harrow elements and the ground, and wherein means are carried by the harrow frame adjacent the driver's seat for adjusting the harrow elements, said means being connected to a yieldable support, the support serving to centralize one end of the adjusting means connected to each harrow element.

It is a further object of the invention to provide a device of this character wherein the actuating ends of the adjusting means are connected to a movable supporting member, said member being arranged for movement by the operator to simultaneously actuate said adjusting means.

It is still a further object of the invention to provide an adjustable harrow of this character wherein the harrow is composed of a plurality of harrow elements or sections adapted to operate substantially in the same plane and arranged for individual or simultaneous vertical movement substantially beneath the frame or support of the harrow.

With these and other objects in view, the invention consists in the improved construction and arrangement of parts to be hereinafter more particularly described, fully claimed and illustrated in the accompanying drawings, in which:—

Figure 1 is a front elevation of an adjustable harrow constructed in accordance with an embodiment of the invention;

Figure 2 is an end elevation showing all of the harrow elements raised;

Figure 3 is an end elevation showing one of the harrow elements raised;

Figure 4 is a top plan view of the structure shown in Figure 1;

Figure 5 is a perspective view of the actuating member and support; and

Figure 6 is a section taken on the line 6—6 of Figure 4.

Referring to the drawings, 5 designates the frame or support of the harrow, said frame comprising angle iron beams 6 and 7, each of said beams having its end portion 8 disposed substantially at right angles to the main portion of the beam. The opposite end portion 9 of the beam is also disposed substantially at right angles to the body portion of the beam. It will be noted that the end portion 9 is longer than the end portion 8, the inner flanges of the ends 8 of the angle iron beams being secured to each other, the body portions of the beam from said end portion 8 extending substantially in divergent relation to each other to provide a V-shaped frame, the end portions 9 being disposed in spaced parallel relation to each other, and having their extremities formed into feet 10. Braces 11 are provided for connecting the end portions 9 of the beams 6 and 7 to each other to substantially reinforce the same. Braces 12 and 13 are also connected to each of the beams for bracing their respective end portions, while secured to the frame immediately above the connection of the end portion 8 of the beams 6 and 7 is a driver's seat 14. By this novel form of frame, it will be seen that the operator is positioned a considerable distance from the ground, so that the work of operating the harrow is more agreeable as the operator is practically out of reach of dust generated by the harrow.

Secured to the upper forward portion of the frame 5, closely adjacent the junction of the end portions 9 with the beams 6 and 7, is a transversely extending angle iron supporting beam 15, said beam extending a considerable distance beyond the outer face of each of the beams 6 and 7 substantially parallel to the outer face of the end portions 9 of said beams. The supporting beam 15 is provided with suitable bracing elements 16 and 17, braces 18 and 19 being also provided for connecting the end portions of said supporting beam to the forward portion of the beams 6 and 7. The purpose of the beam 15 will be hereinafter described.

The outer flanges 20 of the end portions 8 of the angle iron beams 6 and 7 are disposed substantially parallel to each other by the connection of the remaining flanges $20^a$ of said end to each other. Disposed between the flanges 20 is a bracket 21 through which a king bolt 22 extends, the head of said king bolt being engaged with the upper portion of the bracket. A novel form of caster frame 23 is provided, said frame including a bearing 24 through which the king bolt 22 extends, a wheel 25 being mounted within the frame 23.

A runner 26 is connected to the frame by means of the feet 10 of the end portions 9, said feet resting upon the runner. The end portions of the runner extend beyond the end portions 8 and 9 of the frame. The runner corresponds in length to the supporting beam 15 and is also disposed substantially in spaced parallel relation to said beam. The harrow proper is composed of a number of elements or sections and embodies a central element or section 27, said section being substantially V-shaped and including a central supporting member 28 to which a plurality of divergent bars 29 extend, bars 30 being provided for connecting the bars 29 to form the central element. The central element is pivotally connected at its forward end to the intermediate portion of the runner 26 as at $27^a$, while disposed on each side of the central element are additional elements 31 and 32, each of the elements 31 and 32 consisting of a plurality of spaced bars 33 which are disposed in spaced parallel relation to each other and to the outer bars of the central element, the bars of each of the elements 31 and 32 being connected by means of strips 34. Each of the elements 31 and 32 is pivotally connected to the runner 26 as at $28^a$. The harrow also embodies two end sections or elements 35 and 36, each of said elements being constructed similar to the elements 31 and 32. Each of the sections 35 and 36 is pivotally connected as at 37 to the end portions of the runner 26. It is of course obvious that the bars of each of the elements are provided with a plurality of harrow teeth 38 which are arranged in the usual manner.

By the novel arrangement of the elements, it will be noted that the forward and rear portions of the bars of each element are disposed in parallel relation to the runner 26 regardless of the fact that the bars extend substantially obliquely of or in angular relation to the runner 26, so that the desired harrowing effect is produced.

It has been found rather difficult with the previous forms of harrows to clean the teeth, and in addition to this difficulty, considerable time is consumed in view of the fact that it is necessary to stop the harrow in order to accomplish this operation. To overcome this disadvantage, each of the elements of the harrow proper of this device may be adjusted so as to permit cleaning of the desired element without stopping the movement of the harrow or without disturbing the remaining sections which do not require cleaning. This is accomplished by the following means: Connected to the end portion of the beam 15 above the harrow element or section 36 is a pulley 39, while connected to the opposite end of the supporting beam 15 above the element 35 is a pulley 40. A double pulley 41 is connected to the beam above the harrow element 31, while another double pulley 42 is connected to the beam above the element 32. A pair of double pulleys 43 and 44 are connected to the supporting beam 15 adjacent each other and above the central element 27. Connected to the end sections or elements 35 and 36 are cables 46 and 45, said cables extending through all of the pulleys. Cables 47 and 48 are connected to the harrow elements 32 and 31 and extend through the pulleys 41, 42, 43 and 44, while disposed between the pulleys 43 and 44 is a pulley 49 through which a cable 50 is passed, said cable being connected to the central element 27. Each of the above mentioned cables is connected to the rear portion of an element. These cables may be constructed of wire, rope, or chains may be used, as it is only necessary that these adjusting elements be flexible.

Mounted on the upper portion of the frame 5 adjacent the rear ends of the beams 6 and 7 is a shaft 51 on which an actuating member and support 52 is mounted, said member consisting of a length of material bent at its intermediate portion to provide arms 53 and 54, said intermediate portion being formed into a pedal or stirrup 55, the arms 53 and 54 converging from said pedal and having their end portions disposed in parallel relation closely adjacent each other. A sleeve 56 is mounted on the shaft 51 in spaced relation to the stirrup 55 and between the arms 53 and 54, said sleeve registering with openings provided in the arms 53 and 54, through which the shaft 51 extends. A spring 57 surrounds the sleeve 56, one end of said spring being connected to the stirrup 55, while the opposite end of the spring is connected to the sleeve 56, and shaft 51 by a set screw.

A bracket 58 is provided, said bracket being substantially rectangular and is formed from a single length of material, the end portions 59 of said bracket being disposed in parallel relation and adapted to be positioned between the end portions of the arms 53 and 54, suitable fastening means being passed through said end portions of the arms and bracket for securely connecting the same. Extending transversely of the bracket 58 are rods 60 and 61, said rods being disposed in spaced parallel relation to each other, while mounted on each of the rods is a plurality of sleeves 62. Disposed between each two of the sleeves and connected at their ends to each of the rods 60 and 61 is a plurality of plates 63, said plates extending transversely of the rods and cooperating with each other to form compartments or sockets through which the ends of the cables connected to the harrow elements pass, one compartment being provided for each cable. Rings 64 are connected to the free ends of each of the cables, said rings being larger than the compartments or sockets so as to prevent passage of the end portions of the cables through the sockets.

By this novel arrangement, the cables are permitted to adjust themselves according to the movement of the harrow elements over the ground. In other words, the harrow proper is adapted to thoroughly harrow the ground regardless of the depressions and elevations therein. The movement of the elements over said depressions and elevations will not cause strain upon the cables, in view of the fact that the actuating and supporting member 52 is yieldably mounted so that said actuating member will move according to the movement of the harrow elements, as the spring 57 is adapted to normally urge the actuating member and support upwardly.

In the use of the device, if it be desired to elevate any one of the sections because of an obstruction in the path of said section, or for the purpose of cleaning the teeth of said element, it is only necessary for the operator to grasp the ring connected to the cable of said element, and pull the same so as to raise the rear portion of the element independently of the remaining harrow elements, thereby accomplishing the result desired. When the harrow is traveling over the ground and it is not desired that this portion of the ground be harrowed, it is only necessary for the operator to step upon the pedal or stirrup so as to swing the actuating member and support upwardly, thereby simultaneously actuating all of the cables and raising all of the elements from the ground so that only the wheel 25 and runner 26 engage the ground. If it be desired to maintain all of the harrow elements in the elevated position indefinitely, this may be accomplished by means of the hook 65, which is connected to the beam 6 adjacent the driver's seat, the bill of the hook being adapted to engage one of the beams of the actuating and supporting member 52 to maintain said member in its raised position.

From the foregoing it will be readily seen that this invention provides a novel form of harrow wherein the various sections or elements of the harrow may be adjusted individually or simultaneously, and such adjustment may be accomplished with ease without requiring the operator to leave the seat of the harrow and without stopping the harrowing operation. A portion of the bracket 58 is provided with a handle 58$^a$ which permits the actuating member to be operated by hand if desired. This member is also mounted for adjustment longitudinally of the shaft 51, this being possible in view of the fact that the spring 57 is connected to the sleeve 56 and shaft 51 through the medium of a set screw, the set screw permitting the tension of the spring to be adjusted. In addition to this, the novel construction of the frame of the harrow not only permits the elements of the harrow to be readily adjusted, but positions the driver above dust caused by the harrowing operation and thereby permits him to observe clearly the path to be traveled by the harrow.

What is claimed is:—

1. A harrow of the character described comprising a frame, harrow elements movably connected to said frame, adjusting means connected to each of said harrow elements, an operating member movably connected to the frame each of said means being operatively engaged with the operating member and individually operable independently of the operating member, said operating member being arranged for oscillating movement to actuate said adjusting means simultaneously.

2. A harrow of the character described comprising a frame, harrow elements pivoted to said frame, each of said elements being provided with adjusting means, the free ends of said means being centralized and yieldable means for supporting said centralized ends whereby movement of said elements will cause corresponding movement of the adjusting means.

3. A harrow of the character described comprising a frame, harrow elements pivotally connected at one of their ends to the frame, flexible adjusting means connected to the opposite ends of said elements, said means being movably supported upon the frame, a supporting member mounted on said frame, sockets carried by one end portion of said supporting member, said sockets being adapted to receive the free end portions of the adjusting means, the opposite end of said supporting member being formed into a stirrup for oscillating said member and moving said adjusting means simultaneously.

4. A harrow of the character described comprising a frame, harrow elements pivotally connected at one of their ends to the frame, flexible adjusting means connected to the opposite ends of said elements, said means being movably supported upon the frame, a supporting member mounted on said frame, sockets carried by one end portion of said supporting member, said sockets being adapted to receive the free end portions of the adjusting means, the opposite end of said supporting member being formed into a stirrup for oscillating said member and moving said adjusting means simultaneously, said adjusting means being operable independently of the supporting member.

5. A harrow of the character described comprising a frame, the end portions of said frame being extended downwardly, a ground engaging wheel carried by one end of the frame, a runner carried by the opposite end of the frame, harrow elements connected to said elements, adjusting means connected to said elements and movably supported upon the frame, a shaft extending transversely of the upper portion of the frame, an actuating member mounted on said shaft and adapted to receive the end portions of the adjusting means, means carried by said actuating member for normally urging said member upwardly to raise the harrow elements substantially beneath the frame.

In testimony whereof I hereunto affix my signature.

C. G. A. JOHNERSON.